United States Patent [19]

Blumenberg

[11] Patent Number: 5,576,586
[45] Date of Patent: Nov. 19, 1996

[54] ELECTRIC MOTOR, PARTICULARLY A COMMUTATOR MOTOR SEALED TO BE LIQUID-TIGHT, FOR DRIVING AN AXIALLY FLANGE-MOUNTED HYDRAULIC PUMP

[75] Inventor: Rainer Blumenberg, Oldenburg, Germany

[73] Assignee: Licentia Patent-Verwaltungs-GmbH, Frankfurt am Main,, Germany

[21] Appl. No.: 256,071

[22] PCT Filed: Oct. 20, 1993

[86] PCT No.: PCT/DE93/00993

§ 371 Date: Oct. 4, 1994

§ 102(e) Date: Oct. 4, 1994

[87] PCT Pub. No.: WO94/10738

PCT Pub. Date: May 11, 1994

[30] Foreign Application Priority Data

Oct. 24, 1992 [DE] Germany ............... 42 35 962.7

[51] Int. Cl.⁶ .................. H02K 5/10; H02K 5/00
[52] U.S. Cl. .................. 310/88; 310/89; 310/239
[58] Field of Search .................. 310/239, 89, 88

[56] References Cited

U.S. PATENT DOCUMENTS

| | | | |
|---|---|---|---|
| 3,624,434 | 11/1971 | Dafler | 310/90 |
| 4,387,314 | 6/1983 | Iwaki et al. | 310/88 |
| 4,847,528 | 7/1989 | Eguchi et al. | 310/239 |
| 4,883,998 | 11/1989 | Lau | 310/239 |
| 5,089,735 | 2/1992 | Sawaguchi et al. | 310/88 |
| 5,124,602 | 6/1992 | Nishimura et al. | 310/68 B |
| 5,184,039 | 2/1993 | Kraft | 310/89 |
| 5,338,995 | 8/1994 | Takada | 310/89 |
| 5,440,186 | 8/1995 | Forsell et al. | 310/239 |

FOREIGN PATENT DOCUMENTS

| | | |
|---|---|---|
| 0084096 | 7/1983 | European Pat. Off. . |
| 2756729 | 6/1979 | Germany . |
| 3426126 | 1/1986 | Germany . |
| 8908892 | 11/1989 | Germany . |
| 1135652 | 12/1968 | United Kingdom . |

*Primary Examiner*—Steven L. Stephan
*Assistant Examiner*—John C. Butler
*Attorney, Agent, or Firm*—Spencer & Frank

[57] ABSTRACT

An electric motor and drive housing assembly includes a motor housing having an open end and a drive housing. The motor housing is affixed to the drive housing such that the opening of the motor housing faces the outer surface of the drive housing. A rotor accommodated in the motor housing has a rotor shaft supported in the motor housing and extending through the opening. A commutator is mounted on the rotor shaft in a region of the opening. A shaft bearing is mounted on the rotor shaft in a region of the opening. A brush carrier plate is attached to the motor housing and closes the opening. The brush carrier plate forms an end plate of the motor housing and a liquid-tight seal between the motor housing and the drive housing. Brushes are mounted on the brush carrier plate for cooperation with and shifting movement with respect to the commutator. Further, a centering arrangement is provided in the brush carrier plate for centering the shaft bearing.

12 Claims, 1 Drawing Sheet

ELECTRIC MOTOR, PARTICULARLY A COMMUTATOR MOTOR SEALED TO BE LIQUID-TIGHT, FOR DRIVING AN AXIALLY FLANGE-MOUNTED HYDRAULIC PUMP

BACKGROUND OF THE INVENTION

The invention relates to an electric motor, particularly a commutator motor sealed to be liquid-tight. The motor has a bowl-shaped motor housing to which a drive housing is axially flanged. The drive housing accommodates, for example, a hydraulic pump driven by the electric motor. The motor further has a brush carrier plate which supports brushes shiftable relative to the commutator and which is disposed between the end faces of the motor housing and the device housing. Axially flange-mounted hydraulic pump of the type disclosed in the preamble to claim 1.

An electric motor is already known from EP 0,472,746.A1, in which the rotary shaft projects with an eccentric shaft end, which drives the plungers of a flange-mounted hydraulic pump, from the end face of a pot-shaped motor housing sealed by an end shield. Moreover, a separate carrier plate is provided in the end shield for brushes that cooperate in a known way with the commutator provided on the drive. Because of the numerous individual parts, the assembly expenditure in this known electric motor is considerably high.

SUMMARY OF THE INVENTION

It is the object of the invention to further simplify and reduce the cost of an electric motor for driving a hydraulic pump with regard to production and assembly expenditures. This object is accomplished by the invention, according to which, briefly stated, the electric motor and drive housing assembly includes a motor housing having an open end and a drive housing. The motor housing is affixed to the drive housing such that the opening of the motor housing faces the outer surface of the drive housing. A rotor accommodated in the motor housing has a rotor shaft supported in the motor housing and extending through the opening. A commutator is mounted on the rotor shaft in a region of the opening. A shaft bearing is mounted on the rotor shaft in a region of the opening. A brush carrier plate is attached to the motor housing and closes the opening. The brush carrier plate forms an end plate of the motor housing and a liquid-tight seal between the motor housing and the drive housing. Brushes are mounted on the brush carrier plate for cooperation with and shifting movement with respect to the commutator. Further, a centering arrangement is provided in the brush carrier plate for centering the shaft bearings.

The electric motor flange-mounted to the drive housing (pump housing) of the hydraulic pump no longer has an end shield that seals the motor housing to be liquid-tight. According to the invention, the brush carrier plate assumes the sealing function between the motor housing and the pump housing. In addition, the brush carrier plate serves simultaneously as a centering element for a bearing secured to the motor shaft. Because of this, a test of the electric motor has already been performed in this stage of assembly. Also, the electric motor can be safely transported in this pre-assembled state. The omission of the end shield creates an inexpensive and easy-to-assemble electric motor unit for a hydraulic pump.

The invention is described in detail below by way of an embodiment.

DESCRIPTION OF THE PREFERRED EMBODIMENT

Figure 1:
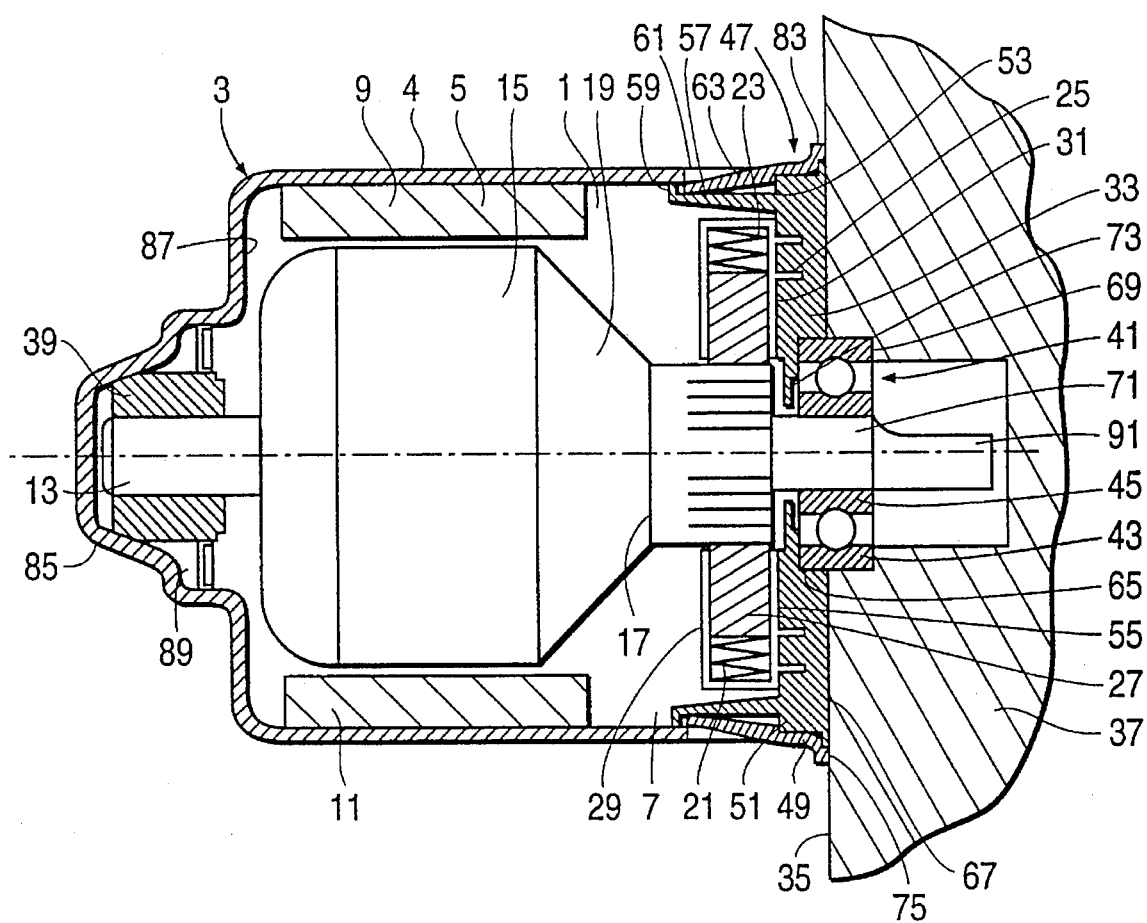
FIG. 1 is an axial partial section of a commutator motor having a flange-mounted pump housing, and is

FIG. 1 shows an electric motor, particularly a sealed, liquid-tight commutator motor 1, having a pot-shaped (bowl-shaped) motor housing 3 whose cylindrical jacket part 4 is provided on the inner side 7 with permanent magnets 9, 11. A rotary shaft 13 to which a rotor lamina stack 15 is secured is disposed in the motor housing, 3 the stack receiving a rotor winding 19 connected to a commutator 17. The commutator 17 is in contact connection with brushes 25, 27, which are acted upon by springs 21, 23 and are guided in housings 29, 31. These guide housings 29, 31 are fixedly connected to a brush carrier plate 33 and are made of, for example, brass. The motor housing 3 is flange-mounted to an end face 35 of a pump housing 37 of a hydraulic pump not shown in detail. A flat sealing element is disposed between the end faces of the motor housing 3 and the pump housing 37. The rotary shaft 13 is seated on the one hand in, for example, a bearing 39 inside motor housing 3 and on the other hand in a bearing 41 which is, for example, a roller bearing having an outer ring 43 and an inner ring 45. According to FIG. 1, the bearing 39 is a sliding bearing held by a set of clamping braces 89, but within the scope of the invention, this bearing can also comprise a roller bearing. The bearing 39 can also be disposed in pump housing 37 as a further bearing for the rotary shaft 13. The roller bearing 41 is a sealed bearing that prevents the penetration of liquids into the bearing, and thus into the motor housing 3.

The rotary shaft 13 protrudes with its extended eccentric end 91 into the pump housing 37, which drives, for example, a motor vehicle anti-locking system by means of non-illustrated pump plungers, of the hydraulic pump.

According to the invention, the flat sealing element between the end faces of the motor housing 3 and the pump housing 37 is the brush carrier plate 33, made of insulating material, for the brushes 25, 27, which cooperate with commutator 17. This brush carrier plate simultaneously serves as a centering element for the bearing 41, which is fixedly disposed on the rotary shaft 13, and is fixedly connected as a lid to motor housing 3. The pot-shaped motor housing 3 is provided in the border edge 47 of its cylindrical opening with a stepped fitting surface 49 for a liquid-tight engagement of the correspondingly configured, disk-shaped brush carrier plate 33, which is provided at its outer edge with a cylindrical flange part 51. Furthermore, the brush carrier plate 33, which can be pressed form-fittingly into the opening of the motor housing 3, has at the outer edge 53 of its inside end face 55 a plurality of resilient latching hooks 57, whose notches 59 can latch behind latching edges 61 formed by metal deformations of motor housing 3. These metal deformations can consist of pushed-through bundles 63 in the motor housing 3, or partially stamped, flexible tabs. The above features result in simple assembly of the brush carrier plate 33 with the motor housing 3, while at the same time a reliable latching of the brush carrier plate 33 with the motor housing 3 and precise pre-centering of the rotary shaft 13 in the motor housing 3 are effected. In this way, a preassembled electric motor 1 for a hydraulic pump is obtained that is already fully testable in this stage, and is also transportable.

Figure 2:
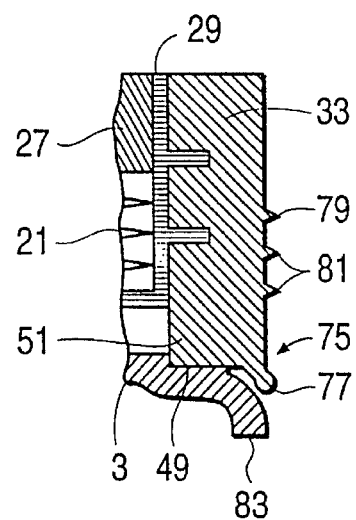
FIG. 2 is a detail from FIG. 1.

According to FIG. 1, at least the bearing 41 is a sealed roller bearing whose outer ring 43 is seated on the one hand in a centering recess 65 in the outer end face 67 of brush carrier plate 33, and on the other hand in a bearing recess 69 in end face 35 of the gear housing 37, and whose inner ring 45 is fixedly disposed with a press fit on a bearing surface 71 of the rotary shaft 13. To reliably prevent the penetration of liquids, for example oil, into the interior of the motor housing 3 from the bearing 41, the centering recess 65 in the end face 67 of the brush carrier plate 33 has an annular, stepped impression 73 as a labyrinth seal in front of the roller bearing 41. Furthermore, the brush carrier plate 33 can be provided at the outer edge 75 on its end face 67 the facing pump housing 37 with a sealing lip 77. This reliably prevents the penetration of liquids into motor housing 3 from the outside. If necessary, the end face 67 of the brush carrier plate 33 can have more annular protrusion 79, 81 as sealing rings disposed concentrically to the centering recess 65 (see FIG. 2). The sealing lip 77 and/or the sealing rings 79, 81 are integral with the brush carrier plate 33. With this measure, a reliable sealing effect against the penetration of liquids into the motor housing 3 is achieved without additional components. It is possible to secure the motor housing 3 to the pump housing 37 in that the motor housing 3 has a flange part 83 that has throughgoing openings for screws, not shown, and is outwardly-oriented by 90°, in the opening of the cylindrical jacket part. In a precise embodiment of the flange part 83 and the end face 35 of the pump housing 37, a sealing effect of this type against the penetration of liquids into pump housing 37 or motor housing 3 is already achieved that renders superfluous sealing lip 77 on brush carrier plate 33.

The bearing 39 for the rotary shaft 13 according to FIG. 1 is disposed in a correspondingly deep-drawn profiling 85 in the floor part 87 of the pot-shaped motor housing 3. The motor housing 3, including the profiling 85, is produced in one work cycle, producing a less expensive and easy-to-assemble electric motor. The electric motor 1 of the invention is therefore well-suited for automatic production, with the omission of the end shield of the motors known up to now.

I claim:

1. An electric motor and drive housing assembly, comprising (a) a motor housing having an open end;

(b) a drive housing having an outer surface; said motor housing being affixed to said drive housing such that said opening of said motor housing faces said outer surface of said drive housing; said drive housing having a bearing recess;

(c) a rotor accommodated in said motor housing; said rotor having a rotor shaft supported in said motor housing and extending through said opening;

(d) a commutator mounted on said rotor shaft in a region of said opening;

(e) a brush carrier plate made of an insulating material and being attached directly to said motor housing and closing said opening; said brush carrier plate having (1) an end face being in engagement with said outer surface of said drive housing; said brush carrier plate forming an end plate of said motor housing and a liquid-tight seal between said motor housing and said drive housing; and (2) a centering recess provided in said end face;

(f) brushes mounted on said brush carrier plate for cooperation with and shifting movement with respect to said commutator; and (g) a shaft bearing having inner and outer bearing rings; said outer bearing ring being seated in said centering recess of said brush carrier plate and in said bearing recess of said drive housing.

2. The assembly as defined in claim 1, wherein said shaft bearing is a sealed roller bearing.

3. The assembly as defined in claim 1, said inner ring being press-fitted on said rotor shaft.

4. The assembly as defined in claim 1, wherein said motor housing has a border defining said opening; said border including a stepped fitting surface engaging liquid tight a periphery of said brush carrier plate.

5. The assembly as defined in claim 1, wherein said brush carrier plate is engaged in said motor housing with a press fit; said motor housing having, in a region of said opening, a plurality of deformations and said brush carrier plate having a plurality of resilient latching hooks hooking behind respective said deformations.

6. The assembly as defined in claim 5, wherein said deformations comprise tabs partially stamped out of the motor housing.

7. The assembly as defined in claim 1, further comprising a labyrinth seal formed in said brush carrier plate within and circumferentially about said centering recess; said labyrinth seal being situated between said shaft bearing and said commutator.

8. The assembly as defined in claim 1, further wherein said brush carrier plate carries a sealing lip extending circumferentially about a periphery of said end face of said brush carrier plate.

9. The assembly as defined in claim 8, wherein said sealing lip is integral with said brush carrier plate.

10. The assembly as defined in claim 8, wherein said centering means comprises a centering recess provided in said end face of said brush carrier plate; further comprising a plurality of annular protrusions disposed on said end face of said brush carrier plate; said annular protrusions constituting sealing rings disposed concentrically to said centering recess.

11. The assembly as defined in claim 10, wherein said annular protrusions are integral with said brush carrier plate.

12. The assembly as defined in claim 1, further wherein said motor housing has a flange for attachment to said outer surface of said drive housing; said flange surrounding said opening and being bent outwardly therefrom.

* * * * *